United States Patent
Nishiyama et al.

(10) Patent No.: US 11,431,636 B2
(45) Date of Patent: Aug. 30, 2022

(54) COMMUNICATION SYSTEM AND COMMUNICATION METHOD

(71) Applicant: Nippon Telegraph and Telephone Corporation, Tokyo (JP)

(72) Inventors: Satoshi Nishiyama, Tokyo (JP); Masayuki Nishiki, Tokyo (JP); Takayuki Fujiwara, Tokyo (JP); Yuki Takei, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/263,442

(22) PCT Filed: Jul. 29, 2019

(86) PCT No.: PCT/JP2019/029693
§ 371 (c)(1),
(2) Date: Jan. 26, 2021

(87) PCT Pub. No.: WO2020/027065
PCT Pub. Date: Feb. 6, 2020

(65) Prior Publication Data
US 2021/0314262 A1  Oct. 7, 2021

(30) Foreign Application Priority Data
Aug. 3, 2018  (JP) .............................. JP2018-147210

(51) Int. Cl.
*H04L 47/125*  (2022.01)
*H04L 49/90*  (2022.01)

(52) U.S. Cl.
CPC ............ *H04L 47/125* (2013.01); *H04L 49/90* (2013.01)

(58) Field of Classification Search
CPC . H04L 47/00; H04L 47/10; H04L 47/12–127; H04L 47/62; H04L 47/6255;
(Continued)

(56) References Cited

U.S. PATENT DOCUMENTS 10,545,778 B1 * 1/2020 Venkata ................. G06F 11/203
10,768,982 B2 * 9/2020 Brownsword ......... G06N 20/00
(Continued)

FOREIGN PATENT DOCUMENTS

EP         3410301 A1 * 12/2018 ......... G06F 9/45533
WO   WO-2017171011 A1 * 10/2017
WO   WO-2018197924 A1 * 11/2018

OTHER PUBLICATIONS

Alaxala.com, [online], "Alaxala Next-generation Mid-range Switch," 2017, retrieved on Jun. 25, 2018, retrieved from URL<https://www.alaxala.com/jp/products/archive/datasheet_pamphlet/pdf/ax8300s_ds_op_ver12_7_r2.pdf>,29 pages (with English Translation).
(Continued)

*Primary Examiner* — Chi H Pham
*Assistant Examiner* — Vladislav Y Agureyev
(74) *Attorney, Agent, or Firm* — Fish & Richardson P.C.

(57) ABSTRACT

A communication system includes a programmable switch configured to perform packet transfer and queuing, a plurality of VNFs configured to execute network functions on packets, and a controller configured to control the programmable switch including a queue distribution unit configured to distribute input packets to any of the plurality of VNFs according to an instruction of the controller with respect to a queue group, the plurality of VNFs each include a load measurement unit configured to measure an amount of consumption of server resources and notify the controller of a load status, and the controller includes a load analysis unit configured to analyze a load of each of the plurality of VNFs
(Continued)

based on a certain rule, and a queue control unit configured to change a queue distribution rule.

3 Claims, 5 Drawing Sheets

(58) Field of Classification Search
CPC ............. H04L 47/82–829; H04L 49/00; H04L 49/90–9094
See application file for complete search history.

(56) References Cited

U.S. PATENT DOCUMENTS

| | | | |
|---|---|---|---|
| 2016/0057075 A1* | 2/2016 | Parikh | H04L 47/125 709/226 |
| 2016/0150421 A1* | 5/2016 | Li | H04L 43/08 370/252 |
| 2016/0182380 A1* | 6/2016 | Mehra | H04L 47/125 709/226 |
| 2017/0104688 A1* | 4/2017 | Mirahsan | H04W 28/0289 |
| 2018/0063018 A1* | 3/2018 | Bosch | H04L 47/822 |
| 2018/0183724 A1* | 6/2018 | Callard | H04L 47/6295 |
| 2018/0262431 A1* | 9/2018 | Zhang | H04L 41/0896 |
| 2018/0324106 A1* | 11/2018 | Billore | H04L 47/822 |
| 2018/0349161 A1* | 12/2018 | Jain | G06F 9/45537 |
| 2018/0367460 A1* | 12/2018 | Gao | H04L 49/3063 |
| 2019/0007320 A1* | 1/2019 | Sukhomlinov | H04L 45/38 |
| 2019/0042294 A1* | 2/2019 | Guim Bernat | G06F 9/5016 |
| 2019/0042339 A1* | 2/2019 | Doshi | G06F 9/45558 |
| 2019/0044889 A1* | 2/2019 | Serres | H04L 49/90 |
| 2019/0045000 A1* | 2/2019 | Hiremath | H04L 49/501 |
| 2019/0129771 A1* | 5/2019 | Chen | G06F 12/0875 |
| 2019/0173803 A1* | 6/2019 | Singh | H04L 41/5025 |
| 2019/0272002 A1* | 9/2019 | Seenappa | G06F 1/324 |
| 2019/0386895 A1* | 12/2019 | Innes | H04L 43/026 |
| 2019/0391855 A1* | 12/2019 | Bernat | G06F 9/5061 |
| 2019/0391856 A1* | 12/2019 | Vasudevan | G06F 9/522 |
| 2019/0394142 A1* | 12/2019 | Zhang | G06F 9/4893 |
| 2020/0403940 A1* | 12/2020 | Daly | H04L 49/70 |
| 2021/0048877 A1* | 2/2021 | Olsen | G06F 9/45558 |

OTHER PUBLICATIONS

Cisco.com, [online], "High CPU utilization on Catalyst 6500/6000 switches," 2018, retrieved on Jun. 25, 2018, retrieved from URL<https://www.cisco.com/c/jp_jp/support/docs/switches/catalyst-6500-series-switches/63992-6k-high-cpu.html>, 21 pages (with English Translation).

* cited by examiner

COMMUNICATION SYSTEM AND COMMUNICATION METHOD

CROSS-REFERENCE TO RELATED APPLICATIONS

This application is a National Stage application under 35 U.S.C. § 371 of International Application No. PCT/JP2019/029693, having an International Filing Date of Jul. 29, 2019, which claims priority to Japanese Application Serial No. 2018-147210, filed on Aug. 3, 2018. The disclosure of the prior application is considered part of the disclosure of this application, and is incorporated in its entirety into this application.

TECHNICAL FIELD

The present disclosure relates to a communication system and a communication method.

BACKGROUND ART

In the related art, there has been proposed a method of separately implementing a group of programmable switches and virtual network functions (VNT's), wherein flow rate limiting is performed on a control packet having a particularly heavy load in traffic to a central processing unit (CPU) to prevent depletion of resources of the CPU having a VNF disposed due to an increase in control packets of some users (see Non-Patent Literatures 1 and 2 for example).

For example, Non Patent Literature 1 describes a method of protecting software from DoS attacks or the like through rate limiting and priority control that are performed on packets to be processed in software by mounting a high load prevention mechanism of software, thereby enabling a stable operation of routing processing and the like. Further, Non Patent Literature 2 describes a method of controlling a rate of packets passed to software using a function of limiting a rate of packets to a CPU, thereby preventing a service rejection attack.

CITATION LIST

Non Patent Literature

Non Patent Literature 1: Alaxala, [online], [Retrieved on Jun. 25, 2018], Internet <URL: https://www.alaxala.com/jp/products/archive/datasheet-_pamphlet/pdf/ax8300s_ds_op_ver12_7_r2.pdf>
Non-Patent Literature 2: High Use Rate of CPU of Catalyst 6500/6000 Switch, [offline], [Retrieved on Jun. 25, 2018], Internet https://www.cisco.comlejp_jp/support/docs/switches/catalyst-6500-series-switches/63992-6k-high-cpu.html

SUMMARY OF THE INVENTION

Technical Problem

However, only the rate limiting for a single CPU is considered in the method of the related art. Therefore, in the method of the related art, in a case in which a programmable switch is connected to a plurality of CPUs, there is a problem in that the number of queues required for rate limiting is insufficient, that the rate limiting cannot be performed on a part of a flow, and that the CPU is congested. In other words, in the method of the related art, the rate limiting can be executed to protect software (CPU) in a single device, but in networks to which software-defined networking (SDN) is applied, software (CPU) and hardware (such as a programmable switch) are separated, and thus rate limiting resources on the hardware side are likely to be depleted when a plurality of CPUs are connected to a single piece of hardware.

The present disclosure has been made in view of the foregoing problem, and an object of the present disclosure is to provide a communication system and a communication method that reduce congestion of CPUs.

Means for Solving the Problem

In order to solve the aforementioned problem and achieve the object, a communication system according to the present disclosure is a communication system configured to execute Internet Protocol (IP) communication, and includes a programmable switch configured to perform packet transfer and queuing, a plurality of virtual network functions (VNFs) configured to execute network functions on packets, a server in which the plurality of VNFs operate, and a controller configured to control the programmable switch, wherein the programmable switch includes a queue group including a plurality of queues, and a queue distribution unit configured to distribute input packets to any of the plurality of VNFs according to an instruction of the controller with respect to the queue group, the plurality of VNFs each includes a load measurement unit configured to measure an amount of consumption of server resources and notify the controller of a load status, and the controller includes a load analysis unit configured to analyze a load of each of the plurality of VNFs based on a certain rule; and a queue control unit configured to change a queue distribution rule for the queue distribution unit according to whether a value based on the number of VNFs having a higher load than a predetermined value exceeds a certain number.

Effects of the Invention

According to the present disclosure, congestion of CPUs is reduced.

DESCRIPTION OF EMBODIMENTS

Figure 1:
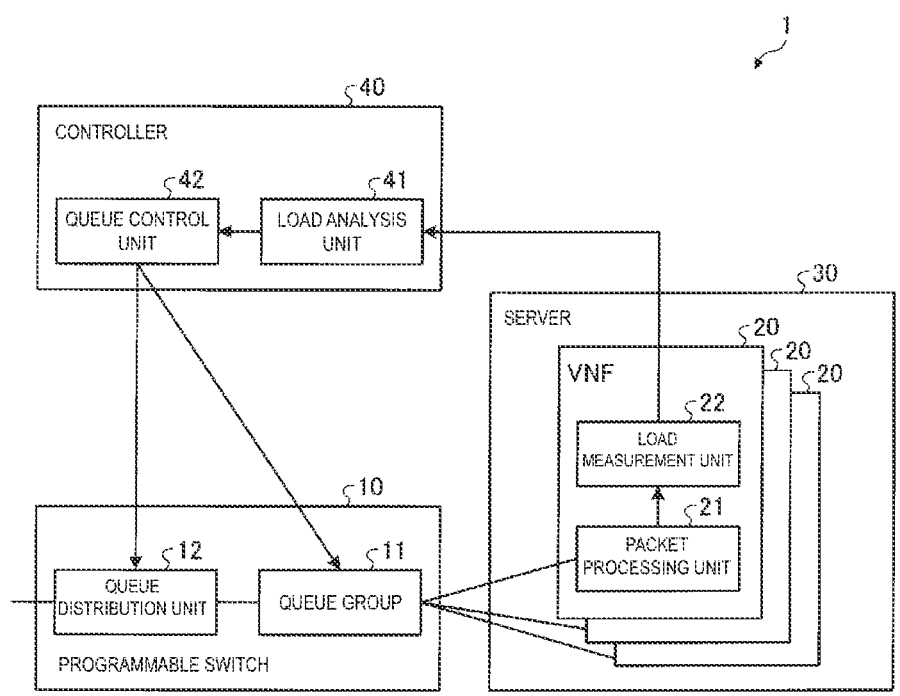
FIG. 1 is a diagram illustrating an example of a configuration of a communication system according to an embodiment.

Hereinafter, an embodiment of the present disclosure will be described in detail with reference to the drawings. The present disclosure is not limited by the embodiment. In the drawings, the same parts are denoted by the same reference signs.

Embodiment

An embodiment of the present disclosure will be described. FIG. 1 is a diagram illustrating an example of a configuration of a communication system according to the embodiment.

As illustrated in FIG. 1, a communication system 1 according to the embodiment includes a programmable switch 10, a plurality of VNFs 20, a server 30 in which the VNFs 20 operate, and a controller 40, and executes IP communication.

The programmable switch 10 performs packet transfer and queuing. The programmable switch 10 includes a queue group 11 including a plurality of queues, and a queue distribution unit 12 that distributes input packets to any of the VNFs 20 according to an instruction of the controller 40 with respect to the queue group 11.

The server 30 has server resources required for the VNFs 20 to operate. The server 30 is an infrastructure for constructing a network function virtualization (NEN), and may be a virtual server prepared on a cloud.

Each VNF 20 is dedicated software for providing functions of the NFV, and is obtained by re-implementing, by software, functions provided by dedicated hardware. Each VNF 20 provides various network functions. For example, the VNF 20 executes the network functions for packets. The VNF 20 includes a packet processing unit 21 that processes packets transferred from the programmable switch 10. The VNF 20 includes a load measurement unit 22 that measures an amount of consumption of the server resources and notifies the controller 40 of a load status.

The controller 40 controls the programmable switch 10. The controller 40 includes a load analysis unit 41 that analyzes the load of each VNF 20 on the basis of a certain rule, and a queue control unit 42 that changes a queue distribution rule for the queue distribution unit 12.

For example, the queue control unit 42 changes the queue distribution rule for the queue distribution unit 12 according to whether a value based on the number of VNFs having a higher load than a predetermined value exceeds a certain number. Specifically, the queue control unit 42 changes the queue distribution rule for the queue distribution unit 12 according to whether the number of VNFs having a higher load than the predetermined value exceeds the certain number. Further, a timing at which the queue distribution rule is changed is not limited thereto.

For example, when a plurality of types of packets that can be classified according to information of headers in the packets are input to each of the VNFs 20, the queue control unit 42 acquires the number of available queues from the queue group 11 (which may be queue resource information). When a product of the number of VNFs having a higher load than the predetermined value and the number of packet types is greater than the number of available queues, the queue control unit 42 changes the queue distribution rule to a distribution rule for performing queue distribution in units of VNFs 20. On the other hand, when the product of the number of VNFs 20 having a higher load than the predetermined value and the number of packet types is smaller than the number of available queues, the queue control unit 42 changes the queue distribution rule to a distribution rule for performing queue distribution according to a combination of the VNFs 20 and the packet types. Thus, the controller 40 may compare the product of the number of VNFs having a higher load than the predetermined value and the number of packet types with the number of available queues, and perform a more appropriate queue distribution.

Processing Flow

Figure 2:
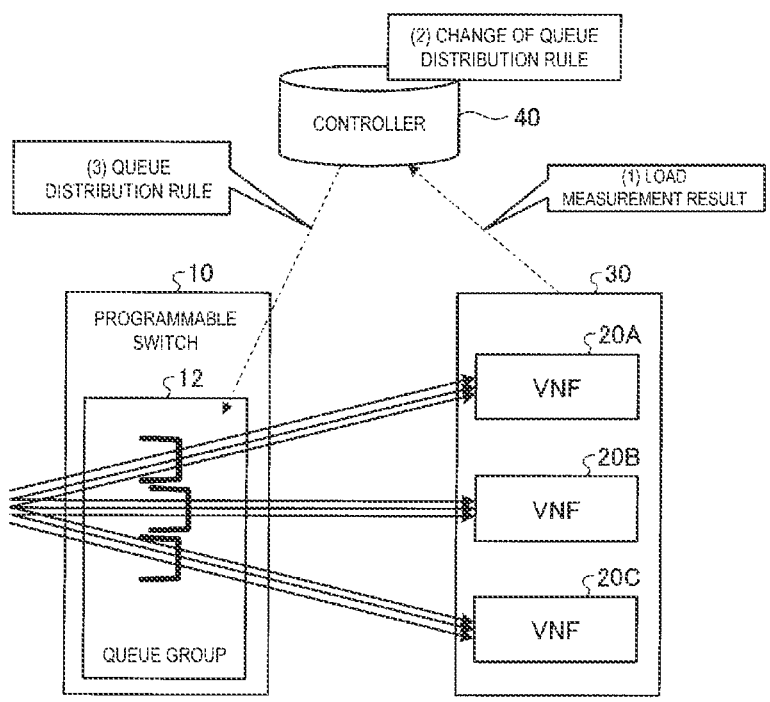
FIG. 2 is a diagram illustrating a processing flow in the communication system illustrated in FIG. 1.
Figure 3:
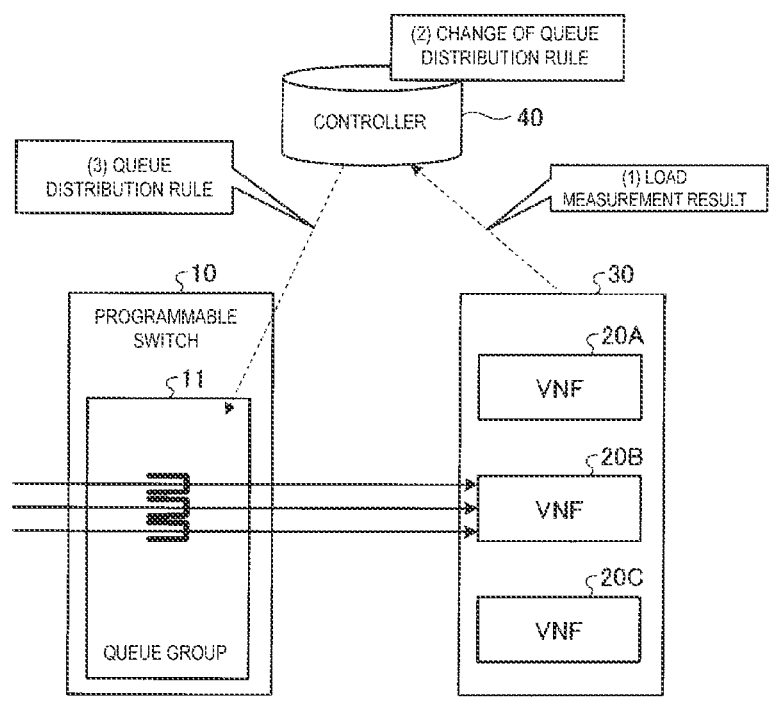
FIG. 3 is a diagram illustrating a processing flow in the communication system illustrated in FIG. 1.

Hereinafter, a processing flow of the communication system 1 will be described. FIGS. 2 and 3 are diagrams illustrating a processing flow of the communication system 1 illustrated in FIG. 1.

First, a case in which a plurality of VNFs are congested will be described by way of example with reference to FIG. 2. As illustrated in FIG. 2, VNFs 20A to 20C each measure an amount of consumption of the server resources and notify the controller 40 of a load status (a load measurement result) (see FIGS. 2(1)). Subsequently, the controller 40 analyzes the loads of VNFs 20A to 20C. When the controller 40 determines as a result of the analysis that the plurality of VNFs 20A to 20C are congested, the controller 40 changes the queue distribution rule (see FIG. 2(2)).

In this example, the controller 40 changes the queue distribution rule to a rule for distributing the queue to each of the VNFs 20A to 20C, and notifies the programmable switch 10 of the changed queue distribution rule (see FIG. 2(3)). As a result, in the programmable switch 10, the queue is distributed to each of the VNFs 20A to 20C. Thus, in the communication system 1, when the plurality of VNFs 20 are congested, coarse rate limiting is performed in units of CPUs, and thus, a service level is lowered as compared to a case in which fine rate limiting is performed, but a network is protected and congestion of the CPUs is reduced.

In FIG. 3, a case in which only a single VNF 20B is congested will be described by way of example. As illustrated in FIG. 3, when the VNFs 20A to 20C each notify the controller 40 of the load status (load measurement result) (see FIG. 3(1)), the controller 40 analyzes loads of the VNFs 20A to 20C. When the controller 40 determines as a result of the analysis that only the VNF 20B is congested, the controller 40 changes the queue distribution rule (see FIG. 3(2)).

In this example, the controller 40 changes the queue distribution rule to a rule for distributing the queues to only the VNF 20B and notifies the programmable switch 10 of the changed queue distribution rule (see FIG. 3(3)). As a result, in the programmable switch 10, the queues are distributed to only the VNF 20B. Thus, in the communication system 1, fine rate limiting is performed on only the VNF 20 in which congestion occurs, thereby improving the service level.

Processing Procedure

Figure 4:
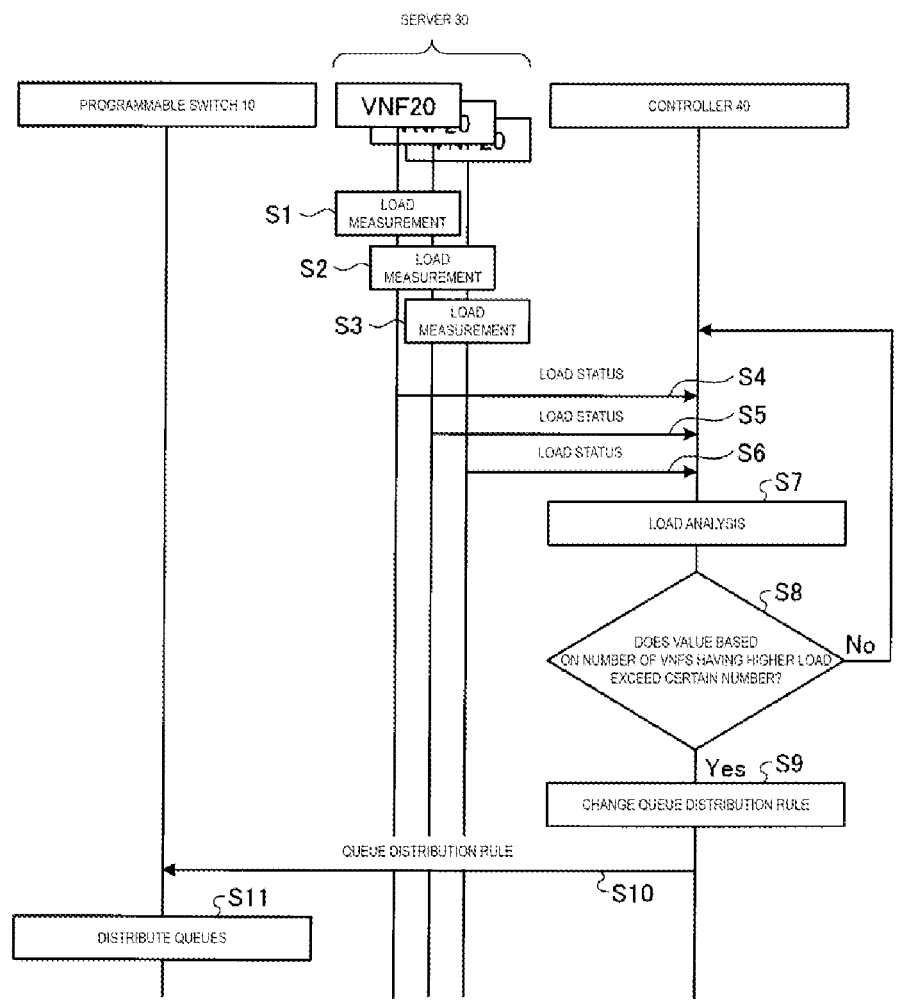
FIG. 4 is a sequence diagram illustrating a processing sequence of communication processing in the communication system illustrated in FIG. 1.

FIG. 4 is a sequence diagram illustrating a processing procedure of communication processing in the communication system 1 illustrated in FIG. 1.

As illustrated in FIG. 4, in the server 30, each VAN 20 performs load measurement for measuring an amount of consumption of the server resources (steps S1 to S3) and notifies the controller 40 of a load status (steps S4 to S6).

The controller 40 analyzes a load of each VNF 20 of each VNF (step S7) to determine whether the value based on the number of VNFs having a higher load than the predetermined value exceeds a certain number (step S8). When the controller 40 determines that the value based on the number of VNFs having a higher load than the predetermined value does not exceed the certain number (step S8: No), the controller 40 receives the load status of each VNF 20 again.

On the other hand, when the controller 40 determines that the value based on the number of VNFs having a higher load than the predetermined value exceeds the certain number (step S8: Yes), the controller 40 changes the queue distribution rule for the programmable switch 10 to reduce the congestion of the CPUs (step 59).

When the programmable switch 10 receives the notification of the changed queue distribution rule from the controller 40 (step 510), the programmable switch 10 distributes the queues according to the changed queue distribution rule (step S it) to reduce the congestion of the CPUs.

Effects of Embodiment

Thus, in the embodiment, the controller 40 analyzes each of the loads of the plurality of VNFs 20 and changes the queue distribution rule for the programmable switch 10 according to whether the value based on the number of VNFs having a higher load than the predetermined value exceeds the certain number. The programmable switch 10 distributes input packets to any of the VNFs 20 according to the distribution rule changed by the controller 40 with respect to the queue group including the plurality of queues.

Therefore, in the embodiment, the queues of the programmable switch 10 are distributed depending on the load status of each of the VNFs 20 and thus congestion of the CPUs is reduced. For example, in the embodiment, two types of distribution rules for coarse rate limiting and fine rate limiting are used, so that the coarse rate limiting is performed in units of the VNFs when congestion occurs in the plurality of NINFs 20, and the fine rate limiting is performed according to some of the VNFs 20 when congestion occurs in the some of the VNFs 20. Thus, in the embodiment, the rate limiting according to the load status is performed so that the congestion of the CPUs is reduced.

System Configuration and the Like

Further, the respective components of the devices that have been illustrated are functional and conceptual, and are not necessarily physically configured as illustrated. That is, a specific form of distribution and integration of the respective devices is not limited to that illustrated, and all or some of the devices can be configured to be functionally or physically distributed and integrated in any units according to various loads, use situations, and the like. Further, all or some of processing functions performed by the respective devices may be implemented by a CPU and a program analyzed and executed by the CPU, or may be implemented as hardware using wired logic.

Further, of the processing described in the embodiment, all or some of the processing described as being performed automatically can be performed manually, and all or some of the processing described as being performed manually can be performed automatically using a known method. In addition, information including the processing procedures, control procedures, specific names, and various types of data and parameters illustrated in the above document or drawings can be optionally changed unless otherwise described.

Program

Figure 5:
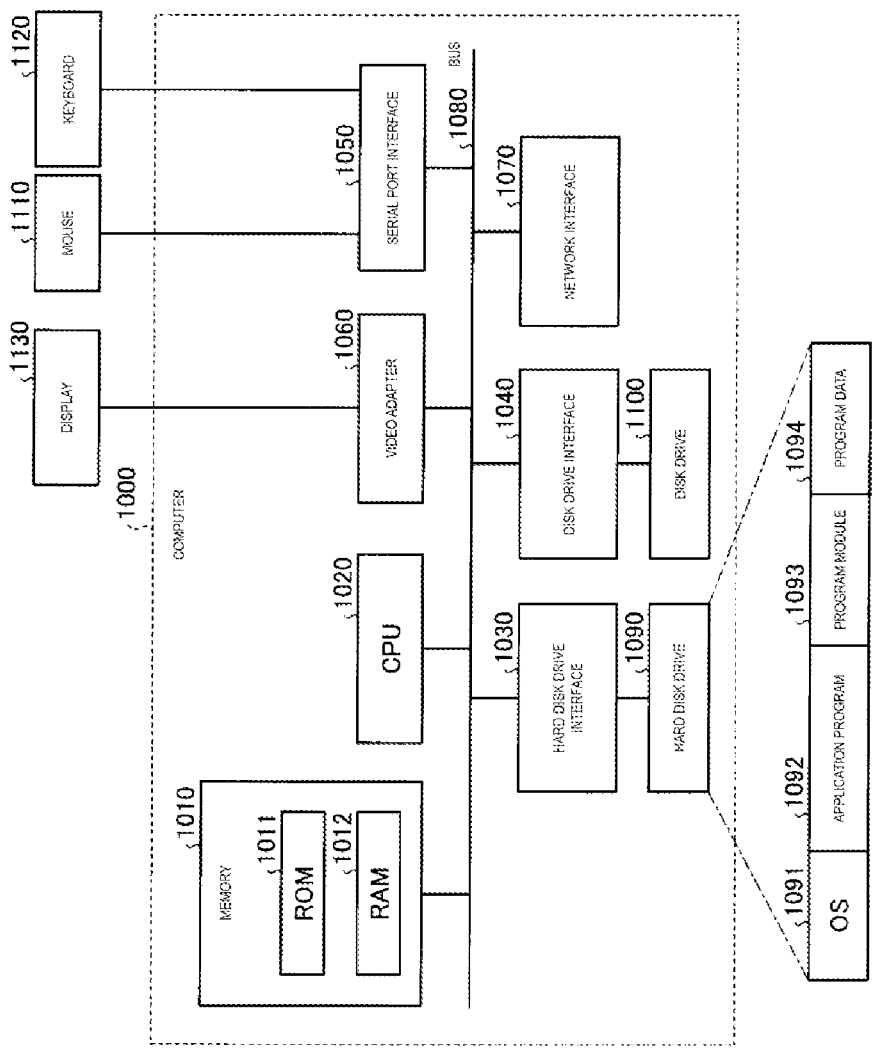
FIG. 5 is a diagram illustrating an example of a computer with which a programmable switch, a server, and a controller are implemented by a program being executed.

FIG. 5 is a diagram illustrating an example of a computer with which the programmable switch 10, the server 30, and the controller 40 are implemented by a program being executed. A computer 1000 includes, for example, a memory 1010 and a CPU 1020. Further, the computer 1000 includes a hard disk drive interface 1030, a disc drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores a boot program such as a basic input output system (BIOS), for example. The hard disk drive interface 1030 is connected to a hard disk drive 1090. The disc drive interface 1040 is connected to a disc drive 1100. A detachable storage medium such as a magnetic disk or optical disc, for example, is inserted into the disc drive 1100. The serial port interface 1050 is connected to a mouse 1110 and a keyboard 1120, for example. The video adapter 1060 is connected to a display 1130, for example.

Here, the hard disk drive 1090 stores, for example, an operating system (OS) 1091, an application program 1092, a program module 1093, and program data 1094. That is, a program that defines each processing of the programmable switch 10, the server 30, and the controller 40 is implemented as the program module 1093 in which a code executable by the computer is described. The program module 1093 is stored in, for example, the hard disk drive 1090. For example, the program module 1093 for executing the same processing as that of each functional configuration in the programmable switch 10, the server 30, and the controller 40 is stored in the hard disk drive 1090. The hard disk drive 1090 may be replaced with a solid state drive (SSD).

Further, setting data to be used in the processing of the embodiment described above is stored as the program data 1094 in, for example, the memory 1010 or the hard disk drive 1090. The CPU 1020 loads the program module 1093 or the program data 1094 stored in the memory 1010 or the hard disk drive 1090 into the RAM 1012 and executes the program module 1093 or the program data 1094 as necessary.

The program module 1093 and the program data 1094 are not limited to being stored in the hard disk drive 1090, and may be stored, for example, in a detachable storage medium and loaded by the CPU 1020 via the disc drive 1100 or the like. Alternatively, the program module 1093 and the program data 1094 may be stored in another computer connected via a network (a. LAN, a wide area network (WAN), or the like). The program module 1093 and the program data 1094 may be loaded by the CPU 1020 from another computer via the network interface 1070.

Although the embodiment to which the present disclosure made by the present inventors is applied has been described above, the present disclosure is not limited by the description and the drawings that make up part of the present disclosure according to the embodiment. That is, all other embodiments, examples, operation technologies, and the like made by those skilled in the art on the basis of the present embodiment are within the scope of the present disclosure.

REFERENCE SIGNS LIST

1 Communication system
10 Programmable switch
11 Queue group
12 Queue distribution unit
20 VNF
21 Packet processing unit
22 Load measurement unit
30 Server
40 Controller
41 Load analysis unit
42 Queue control unit

The invention claimed is:

1. A communication system configured to execute Internet Protocol (IP) communication, the communication system comprising:
a programmable switch configured to perform packet transfer and queuing,
a plurality of virtual network functions (VNFs) configured to execute network functions on packets,
a server in which the plurality of VNFs operate, and a controller configured to control the programmable switch, wherein the programmable switch includes:
- a queue group including a plurality of queues, and
- a queue distribution unit configured to distribute input packets to any of the plurality of VNFs according to an instruction of the controller with respect to the queue group, wherein the plurality of VNFs each include a load measurement unit configured to measure an amount of consumption of server resources and notify the controller of a load status, and wherein the controller includes:
- a load analysis unit configured to analyze a load of each of the plurality of VNFs based on a certain rule, and
- a queue control unit configured to change a queue distribution rule for the queue distribution unit according to whether a value exceeds a certain number based on a number of the plurality of VNFs having a higher load than a predetermined value.

2. The communication system according to claim 1, wherein the queue control unit is configured to:
- acquire a number of available queues from the queue group when a plurality of types of packets classifiable according to information of headers in the packets are input to each of the plurality of VNFs,
- change the queue distribution rule to a distribution rule for performing queue distribution in units of the plurality of VNFs when a product of the number of the plurality of VNFs having the higher load and a number of the plurality of types of packets is greater than the number of available queues, and
- change the queue distribution rule to a distribution rule for performing queue distribution according to a combination of the plurality of VNFs and the plurality of types of packets when the product of the number of the VNFs having the higher load and the number of the packet types is smaller than the number of available queues.

3. A communication method executed by a communication system configured to execute Internet Protocol (IP) communication, the communication system comprising a programmable switch configured to perform packet transfer and queuing, a plurality of virtual network functions (VNFs) configured to execute network functions on packets, a server in which the plurality of VNFs operate, and a controller configured to control the programmable switch, wherein the programmable switch includes a queue group including a plurality of queues, and wherein the communication method comprises:
- measuring, by each of the plurality of VNFs, an amount of consumption of server resources and notifying the controller of a load status;
- analyzing, by the controller, a load of each of the plurality of VNFs based on a certain rule;
- changing, by the controller, a queue distribution rule for the programmable switch according to whether a value is exceeded based on a number of the plurality of VNFs having a higher load than a predetermined value; and
- distributing, by the programmable switch, input packets to any of the plurality of VNFs according to the queue distribution rule changed by the controller with respect to the queue group.

* * * * *